(12) United States Patent
Grabow

(10) Patent No.: US 8,886,406 B2
(45) Date of Patent: *Nov. 11, 2014

(54) CORNER UNIT GUIDANCE CONTROL SYSTEM USING ONE ANTENNA

(75) Inventor: John Grabow, Ft. Calhoun, NE (US)

(73) Assignee: Lindsay Corporation, Omaha, NE (US)

( * ) Notice: Subject to any disclaimer, the term of this patent is extended or adjusted under 35 U.S.C. 154(b) by 738 days.

This patent is subject to a terminal disclaimer.

(21) Appl. No.: 12/986,364

(22) Filed: Jan. 7, 2011

(65) Prior Publication Data

US 2012/0010782 A1    Jan. 12, 2012

Related U.S. Application Data

(60) Provisional application No. 61/295,344, filed on Jan. 15, 2010.

(51) Int. Cl.
*A01B 69/00* (2006.01)
*A01G 25/09* (2006.01)
*G01S 19/14* (2010.01)

(52) U.S. Cl.
CPC .............. *G01S 19/14* (2013.01); *A01G 25/092* (2013.01)
USPC ............ 701/41; 701/36; 701/72; 340/426.16; 340/426.31

(58) Field of Classification Search
CPC ................ A01G 25/092; G01S 19/14
USPC ................ 701/36, 41, 72, 412; 340/426.24, 340/426.31, 426.16
See application file for complete search history.

(56) References Cited

U.S. PATENT DOCUMENTS

| | | | |
|---|---|---|---|
| 4,172,551 A * | 10/1979 | Johnson | 239/733 |
| 6,095,439 A | 8/2000 | Segal et al. | |
| 6,290,151 B1 * | 9/2001 | Barker et al. | 239/729 |
| 6,923,390 B1 | 8/2005 | Barker | |
| 8,442,722 B2 * | 5/2013 | Grabow et al. | 701/41 |
| 2010/0274398 A1 | 10/2010 | Choat | |

* cited by examiner

*Primary Examiner* — Gertrude Arthur Jeanglaude
(74) *Attorney, Agent, or Firm* — Hovey Williams LLP

(57) ABSTRACT

A corner unit guidance control system for use with a corner unit that is part of a center pivot irrigation system includes an antenna, a receiver, and a controller. The antenna may be located along a vertical axis through the center of a wheel of the corner unit and may be operable to receive signals from at least one external positional information source. The receiver may be in communication with the antenna and operable to process the signals to produce position data corresponding to a current position of the wheel. The controller may be in communication with the receiver and may be programmed to steer the wheel to a heading corresponding to a difference between the current position of the wheel and a point along the path.

11 Claims, 3 Drawing Sheets

CORNER UNIT GUIDANCE CONTROL SYSTEM USING ONE ANTENNA

RELATED APPLICATIONS

This non-provisional patent application claims priority benefit with regard to all common subject matter of the earlier filed U.S. Provisional patent application titled "GPS CORNER GUIDANCE CONCEPT USING ONE ANTENNA", Ser. No. 61/295,344, filed on Jan. 15, 2010, which is hereby incorporated by reference in its entirety into the present application.

BACKGROUND OF THE INVENTION

1. Field of the Invention

Embodiments of the present invention relate to center pivot irrigation systems that include a corner unit. More particularly, embodiments of the present invention relate to guidance control systems for controlling the route followed by corner units of center pivot irrigation systems.

2. Description of the Related Art

Center pivot irrigation systems are typically used for crop irrigation and generally include a pipeline connected to a fluid source, a plurality of towers, and a plurality of mechanical drive units. The fluid source may be a tank, a well, or a similar source that has a fixed location. The pipeline may include a plurality of fluid-spraying sprinklers distributed along its length, wherein one end of the pipeline is rotatably coupled to the fluid source. The towers generally support the pipeline and are spaced apart such that several sprinklers are located between each tower. The mechanical drive units may include an electric motor or a similar source of propulsion. Each tower may also include one or more wheels that are fixed in orientation and driven by a mechanical drive unit. In general, the mechanical drive units propel the towers and the pipeline around the fluid source to provide crop irrigation over a circular area.

When the boundaries of the crops to be irrigated are irregular or non-circular, an extendable corner unit may be added to the free end of the pipeline to more fully irrigate the irregular or non-circular area. The corner unit may include additional pipeline and sprinklers as well as at least one tower with a mechanical drive unit and one or more wheels that are steerable. Typically, an overhang portion of the pipeline and sprinklers extends outward beyond the tower. Thus, it is likely that there are crops located on the inward side of the tower (toward the fluid source) and the outward side of the tower (away from the fluid source). Accordingly, there may be a path for the wheels to follow that includes crops on both sides of the path. Therefore, the wheels need to be guided with precision in order to optimize the efficiency of the irrigation and avoid damage of the crops by the wheels.

SUMMARY OF THE INVENTION

Embodiments of the present invention provide a distinct advance in the art of center pivot irrigation systems. More particularly, embodiments of the invention provide an improved guidance control system to control the route followed by a corner unit of a center pivot irrigation system.

One embodiment of the guidance control system broadly comprises an antenna, a receiver, and a controller. The antenna may be located along a vertical axis through the center of a wheel of the corner unit and may be operable to receive signals from at least one external positional information source. The receiver may be in communication with the antenna and operable to process the signals to produce position data corresponding to a current position of the wheel. The controller may be in communication with the receiver and may be programmed to steer the wheel to a future heading corresponding to a difference between the current position of the wheel and a point along the path.

The guidance control system may also include a wheel angle sensor from which the current heading of the wheel can be determined. If the future heading is different from the current heading, then the controller may transmit a signal to a wheel steering unit to rotate the wheel about the vertical axis to an angle corresponding to the future heading.

Another embodiment of the present invention may include a method of steering a wheel of a corner unit along a path, comprising the steps of acquiring a current position of a center of the wheel with an antenna; calculating a point along the path that is a radial distance from the current position; calculating a future heading as the vector difference between the point and the current position; and steering the wheel to match the future heading.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
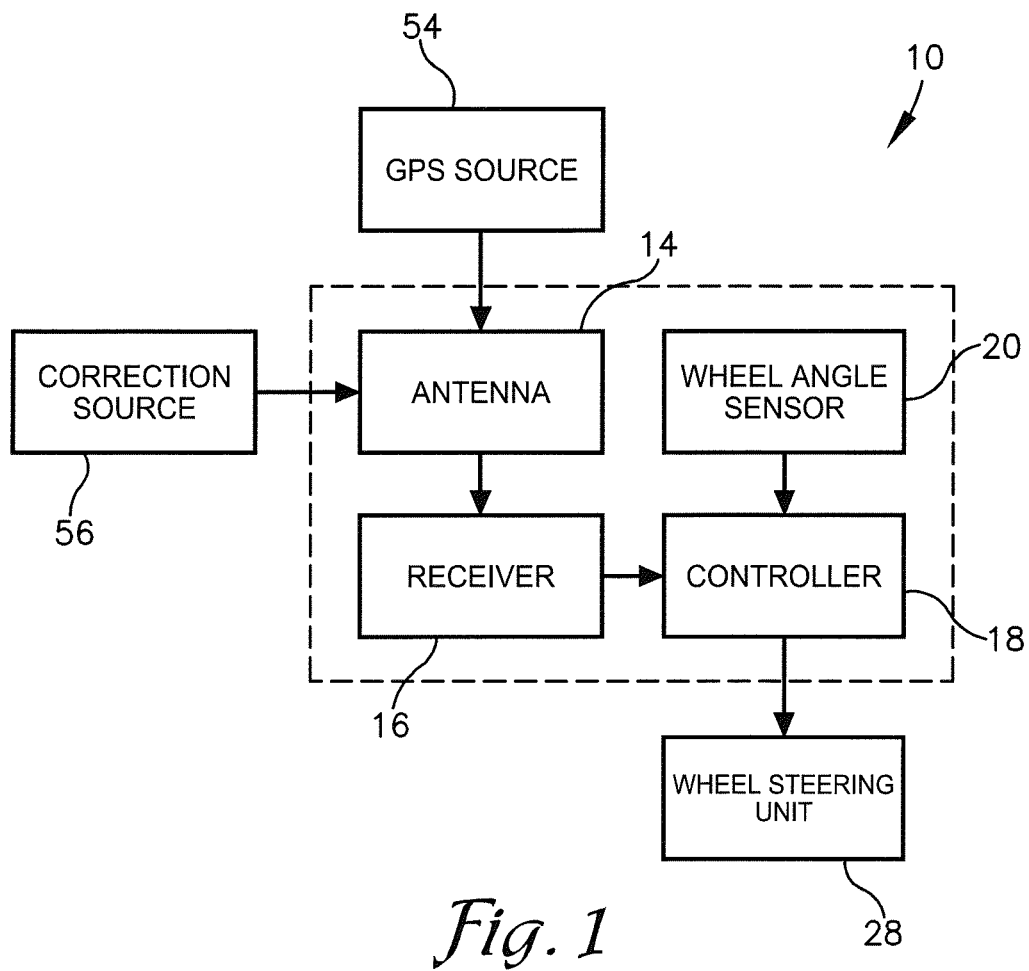
FIG. 1 is a block diagram of a guidance control system, constructed in accordance with various embodiments of the present invention, for use with a corner unit of a center pivot irrigation system.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A guidance control system 10, constructed in accordance with various embodiments of the current invention, for use with a corner unit 12 that is part of a center pivot irrigation system is shown in FIG. 1. The guidance control system 10 may broadly comprise an antenna 14, a receiver 16, and a controller 18. The guidance control system 10 may optionally include a wheel angle sensor 20.

The center pivot irrigation system, not shown in the figures, is generally utilized to irrigate crops or other farmland areas and may include a pipeline connected to a fluid source, a plurality of towers, and a plurality of mechanical drive units. The fluid source may be a tank, a well, or a similar source that has a fixed location. The pipeline may include a plurality of fluid-spraying sprinklers distributed along its length, wherein one end of the pipeline is rotatably coupled to the fluid source. The towers generally support the pipeline and are spaced apart such that several sprinklers are located between each tower. The mechanical drive units may include an electric motor or a similar source of propulsion. Each tower may also include one or more wheels that are fixed in orientation and driven by a mechanical drive unit. Driving of the wheels generally propels the pipeline to rotate in a circle around the fluid source. Given this basic setup, the center pivot irrigation system is operable to irrigate crops over a circular area. In order to irrigate land in an irregular or non-circular pattern, the corner unit 12 is added to the free end of the pipeline.

Figure 2:
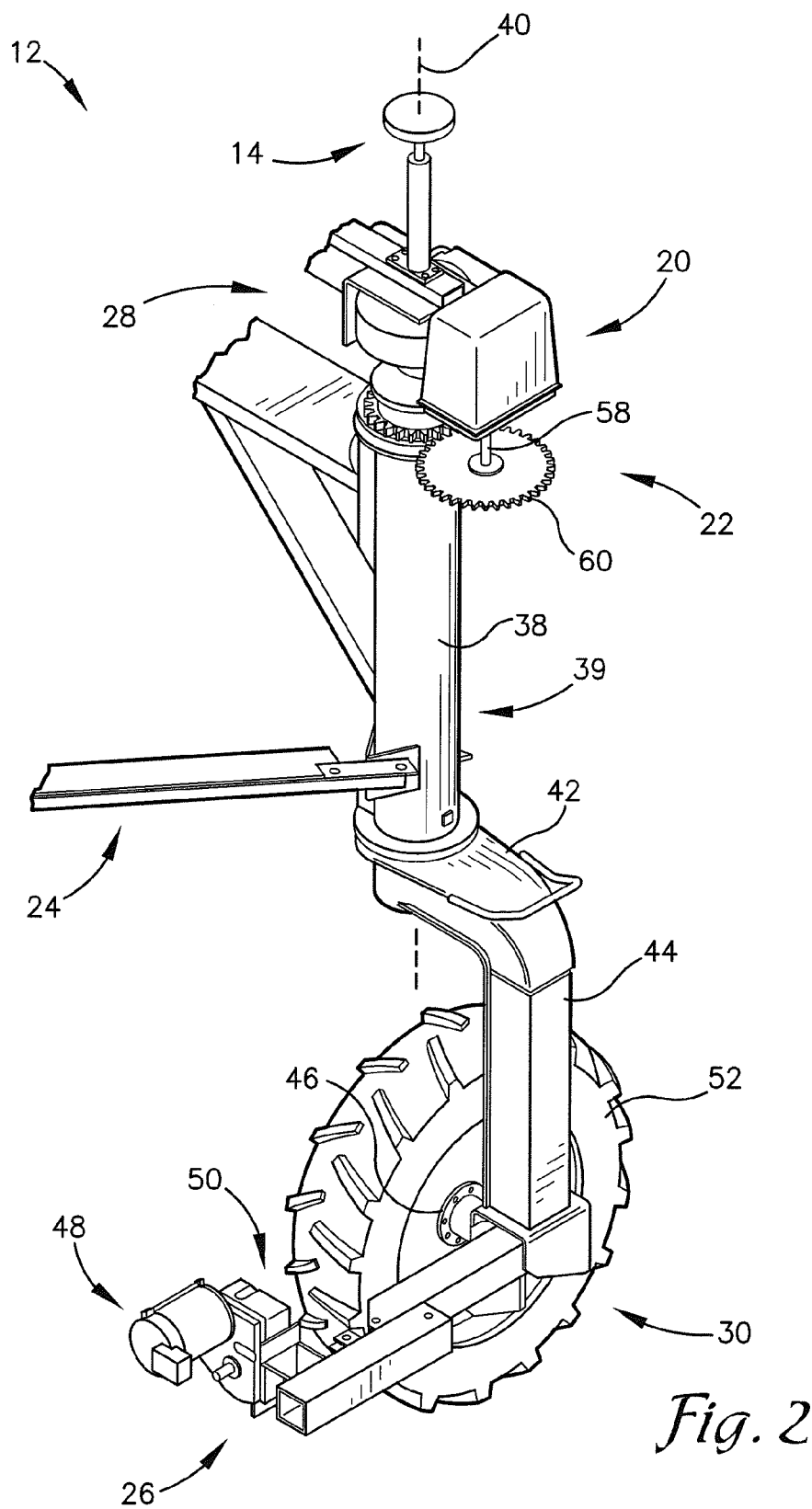
FIG. 2 is a fragmentary perspective view of a portion of a tower of the corner unit.
Figure 3:
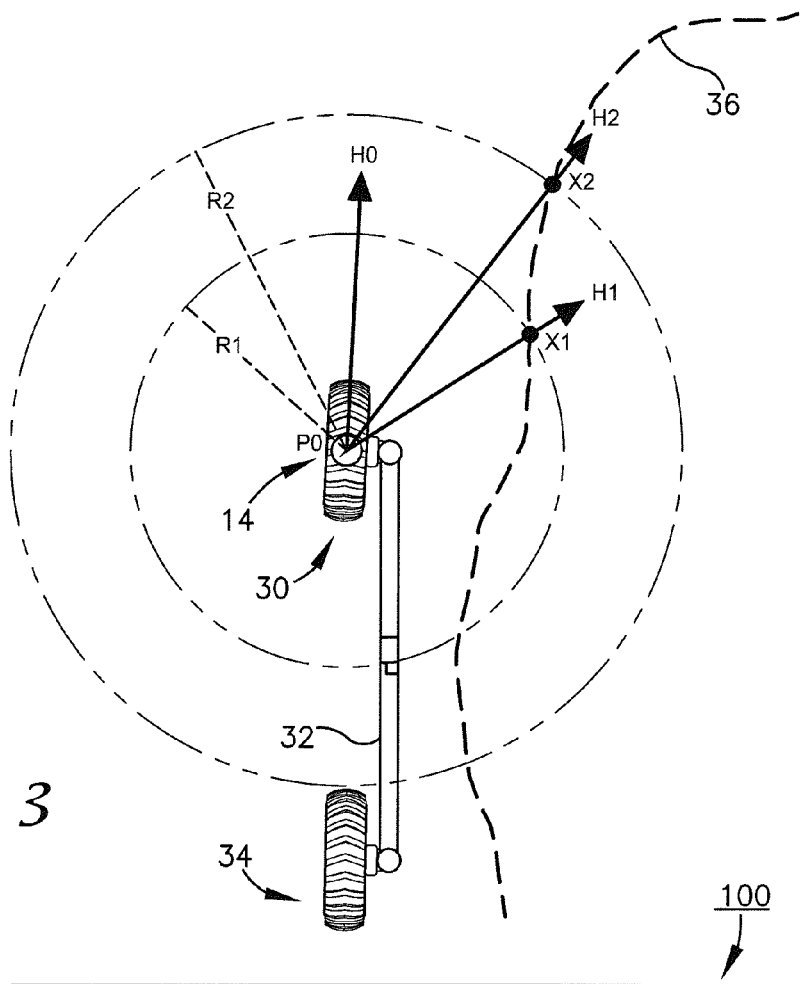
FIG. 3 is a schematic top view illustrating the steering of a forward wheel and a rear wheel of the corner unit.

The corner unit 12 may include additional pipeline and sprinklers as well as at least one tower 22, a portion of which is shown in FIG. 2. The corner unit 12 comprises, in part, a frame 24, a mechanical drive unit 26, a wheel steering unit 28, a forward wheel 30, and a coupling rail 32 and a rear wheel 34, as shown in FIGS. 2 and 3.

In general, an overhang portion of the pipeline and the sprinklers may extend outward beyond the tower 22 in a direction away from the fluid source of the center pivot irrigation system. Thus, it is likely that there are crops located on the inward side of the tower 22 (toward the fluid source) and the outward side of the tower 22 (away from the fluid source). Accordingly, there may be a path 36, seen in FIG. 3, for the wheels 30, 34 to follow that includes crops or vegetation to be irrigated on both sides.

The frame 24 may include trusses or portions thereof, or other mechanical support and strengthening structures to couple the pipeline to the forward wheel 30 and the rear wheel 34. The tower 22 may also include a tubular outer shaft 38 that is vertically oriented and coupled to the frame 24. The longitudinal axis of the outer shaft 38 may establish a centerline vertical axis 40. In addition, the tower 22 may include a tubular inner shaft 39 of a smaller diameter than the outer shaft 38 and positioned concentrically therein. The inner shaft 39 may also be able to rotate within the outer shaft 38.

A lower end of the inner shaft 39 may couple to a right-angle connector 42, which in turn couples to an arm 44 that is vertically oriented and positioned opposite the shaft 38. Thus, the arm 44 may rotate about the vertical axis 40 at a radial distance away from the vertical axis 40. The lower end of the arm 44 may couple to an axle 46 about which the forward wheel 30 rotates when the corner unit 12 is in motion. The arm 44 is generally greater in length than the radius of the forward wheel 30 by at least a few inches in order to provide clearance between the forward wheel 30 and the lower end of the inner shaft 39. Furthermore, the center of the forward wheel 30 is generally aligned with the vertical axis 40, such that the forward wheel 30 is generally positioned beneath the outer shaft 38 and the inner shaft 39.

The mechanical drive unit 26 may include a motor 48 and a drive mechanism 50. The motor 48 may be an electric AC or DC motor, as is known in the art, although the motor 48 may include additional or alternative sources of propulsion as well. An exemplary motor 48 is a 480 Volt motor. The drive mechanism 50 may receive mechanical input from the motor 48 and may include linkages, gears, gear boxes, and other mechanical components in order to rotate the forward wheel 30 about the axle 46 at the lower end of the arm 44.

The wheel steering unit 28, a portion of which is shown in FIG. 2, may include one or more electric motors to directly or indirectly rotate the inner shaft 39. An exemplary embodiment of the wheel steering unit 28 may include a 480 Volt, three-phase motor coupled with two gear boxes, each gear box being coupled through a contactor. One gear box may steer the forward wheel 30 to the right, and the other gear box may steer the forward wheel 30 to the left. The gear boxes may be coupled to the inner shaft 39. Rotation of the inner shaft 39 also rotates the forward wheel 30 about the vertical axis 40 in order to steer the corner unit 12. The wheel steering unit 28 may receive an electrical input, either a voltage level, a current level, or a digital code, from the controller 18 that instructs the wheel steering unit 28 to rotate the forward wheel 30 about the vertical axis 40, or steer the forward wheel 30 by a certain value, such as a certain number of degrees. The controller 18 may instruct the wheel steering unit 28 to steer the forward wheel 30 to an absolute bearing or to rotate the forward wheel 30 by a certain number of degrees relative to its current heading.

The forward wheel 30 may include a tire 52, typically manufactured from rubber, as is known in the art, that includes raised features along an outer wall of the tire 52 that generally maintain traction of the tire 52 over uneven or slick terrain. The forward wheel 30 may be coupled to the axle 46 at the lower end of the arm 44 and may be driven by the mechanical drive unit 26.

The rear wheel 34 may be substantially similar to the forward wheel 30 and may be connected to the arm 44, and by extension the forward wheel 30, through the coupling rail 32. The rear wheel 34 may be passively pulled or pushed by the motion of the forward wheel 30, or the rear wheel 34 may be linked to the drive mechanism 50 such that the motor 48 actively drives both the forward wheel 30 and the rear wheel 34. In some embodiments, the rear wheel 34 may have its own drive mechanism 50. Furthermore, the rear wheel 34 may be linked to the forward wheel 30 such that the rear wheel 34 and the forward wheel 30 are steered as a unit. Thus, the rear wheel 34 and the forward wheel 30 are always rotated to roughly the same heading.

The antenna 14 of the guidance control system 10 generally receives signals that can be decoded to determine positioning information. The antenna 14 may be appropriately shaped and sized to receive radio frequency signals from one or more satellite sources and one or more terrestrial sources. The antenna 14 may be positioned on the upper end of the inner shaft 39, typically such that the center of the antenna 14 is placed along the vertical axis 40 and in turn is roughly above the center of the forward wheel 30. Thus, the antenna 14 generally receives information that can be used to determine the location of the forward wheel 30, specifically the center of the forward wheel 30.

The antenna 14 may receive information from a GPS source 54, such as the Global Positioning System satellite navigation system, that can be processed or decoded to determine a rough position. The antenna 14 may also receive correction information from a correction source 56, such as a Real Time Kinematic (RTK) system, which provides correction information about the GPS signal to increase the accuracy of the position determination from the GPS source 54. The correction source 56 may be terrestrial-based and may include a dedicated or shared RTK base station plus radios (900 MHz ISM spread spectrum or licensed at approximately 450 MHz) or a public or commercial virtual reference station plus cellular or radio connections, or may be satellite-based such as OmniSTAR® with compatible receiving components.

The receiver 16 generally receives signals from the antenna 14 and decodes them to determine the position of the antenna 14 and thus the forward wheel 30. The receiver 16 may include crystal oscillators and signal amplifiers as well as other components as are known in the art. The receiver 16 generally outputs the position, such as the latitude and longitude, of the antenna 14.

The controller 18 may include processors, microprocessors, microcontrollers, field-programmable gate arrays (FPGAs), similar programmable logic devices, or combinations thereof. The controller 18 may further include data storage components, or memory, such as random-access memory (RAM), read-only memory (ROM), erasable programmable read-only memory (EPROM), and the like, as well as hard drives, compact disc ROM (CDROM) drives, digital video disc (DVD) drives, flash drives, or the like, and combinations thereof. The controller 18 may also include data input devices, such as keypads, keyboards, mice, etc., and data output devices, such as monitors, displays, lighted indicators, printers, and the like. The controller 18 may additionally include ports to receive data from external sources such as hard wired ports to receive electrical data over a wire or cable, or radio-frequency (RF) ports to receive data wirelessly.

The controller 18 may be configured or programmed to execute instructions or operations which may be implemented in hardware, software, firmware, or combinations thereof. In various embodiments, the instructions may be included in a program which may be stored on a computer-readable medium such as RAM, ROM, EPROM, flash memory, a hard-disk drive, a floppy disk, a CD or CDROM or variations thereof, a DVD, a Blu-ray Disc™ (BD), and the like.

The controller 18 generally receives positional information about the position of the antenna 14 from the receiver 16. In some embodiments, the controller 18 may have stored information about the path 36 that the wheels 30, 34 should follow. In other embodiments, the controller 18 may receive information about the path 36 from an external source. As discussed in more detail below, the controller 18 may output information or signals to the wheel steering unit 28 to adjust the heading of the forward wheel 30 based on the current position of the forward wheel 30, the current angle of the forward wheel 30, and the path 36 that the corner unit 12 is supposed to follow.

The wheel angle sensor 20 may include components operable to determine the rotational position of an object with respect to a reference. An exemplary embodiment of the wheel angle sensor 20 may include a rotary potentiometer, as is known in the art, whose shaft 58 may be coupled through a gear 60 to the inner shaft 39. Rotation of the forward wheel 30 and in turn the inner shaft 39 also rotates the shaft 58 of the wheel angle sensor 20 proportionately, which changes the voltage of the potentiometer. Thus, the wheel angle sensor 20 may output a voltage that is proportional to the angle or heading of the forward wheel 30. It is also within the scope of the invention for the wheel angle sensor 20 to output a current level or a digitized code that corresponds to the angle of the forward wheel 30.

In general, the center pivot irrigation system, driven by the mechanical drive units, moves in a circle while irrigating crops. The corner unit 12, coupled to the moving end of the center pivot irrigation system, may move in a non-circular or irregular pattern while irrigating crops. The path 36 determines the route that the wheels 30, 34 should follow for the corner unit 12 to properly irrigate an area. In order for the wheels 30, 34 to follow the path 36, the guidance control system 10 may operate as follows.

The antenna 14 may receive positional information from the GPS source 54 and correction information from the correction source 56 in a continuous and real-time fashion as is typically determined and controlled by the external systems such as the Global Positioning System and an RTK or similar system. The antenna 14 may communicate the signal with the positional and correction information to the receiver 16 as it is received.

Some of the actions or operations of the guidance control system 10 described hereinafter generally occur once every update interval. The update interval may be a certain number of binary digital clock periods, such as a certain number of system clock cycles. Or, the update interval may be a certain real time period, such as a certain number of milliseconds or seconds.

The controller 18 may retrieve or receive a current position P0, as shown in FIG. 3, of the antenna 14, and in turn the forward wheel 30, from the receiver 16. The controller 18 may then determine a current heading H0 in one of at least two ways. If the wheel angle sensor 20 is present, the controller 18 may retrieve or receive the current wheel heading H0 from the wheel angle sensor 20. Otherwise, the controller 18 may calculate the heading H0 as the vector difference between the current position P0 and the last recorded position.

The controller 18 may then calculate a first point X1 along the path 36 in the direction of travel that is a first radial distance R1 away from the current position P0. If the distance R1 does not intersect the path 36, perhaps as the result of the wheels 30, 34 drifting off course, then X1 may be calculated as the point on the path 36 that is closest the current position P0. The controller 18 may then calculate a first future heading H1 as the vector difference between the first point X1 and the current position P0. If the first future heading H1 is the same as the current heading H0, then no change to the wheels 30, 34 is made. Otherwise, if the first future heading H1 is different from the current heading H0, then the wheels 30, 34 are steered to match the first future heading H1. The steering may be accomplished by the controller 18 transmitting information or signals to the wheel steering unit 28 that adjusts the wheels 30, 34 to a certain angular or rotational position.

If smoother steering is desired, if the steering is updated less often, or if other parameters change, then the radial distance may change to a second radial distance R2 that is greater than R1. In a fashion similar to that described above, the controller 18 may calculate a second point X2 along the path 36 in the direction of travel that is second radial distance R2 away from the current position P0. The controller 18 may then calculate a second future heading H2 as the vector difference between the second point X2 and the current position P0. If the second future heading H2 is the same as the current heading H0, then no change to the wheels 30, 34 is made, else the wheels 30, 34 are steered to match the second future heading H2.

In general, the radial distance may be adjusted as needed to achieve varying design criteria or requirements.

Figure 4:
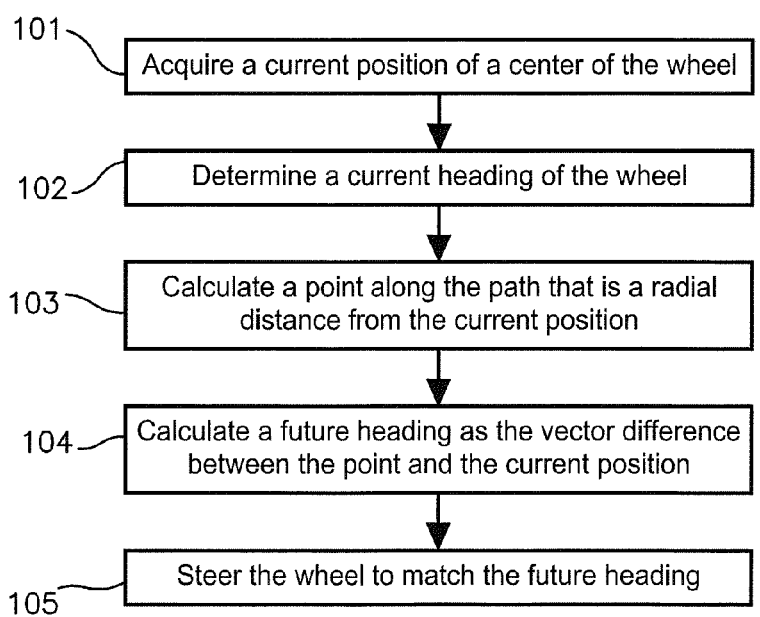
FIG. 4 is a flow diagram of at least a portion of the steps of a method of steering the forward wheel of the corner unit along a path using the guidance control system.

At least a portion of the steps of a method 100 for steering a wheel, such as the forward wheel 30, of a corner unit 12 along a path 36 using a guidance control system 10, in accordance with various embodiments of the current invention, is shown in FIG. 4. The steps may be performed in the order as shown in FIG. 4, or they may be performed in a different order. Furthermore, some steps may be performed concurrently as opposed to sequentially. In addition, some steps may be omitted. In various embodiments, a second or rear wheel 34 may be steered at the same time as the forward wheel 30.

Referring to step 101, a current position P0, as seen in FIG. 3, of the center of the forward wheel 30 is acquired. The current position P0 may be retrieved or received from a receiver 16 that is coupled with an antenna 14, located along a vertical axis 40 through the center of the forward wheel 30. The antenna 14 may receive GPS position information along with RTK correction information that is used to determine the position of the forward wheel 30 with high precision.

Referring to step 102, a current heading H0 of the forward wheel 30 is determined. If the guidance control system 10 includes a wheel angle sensor 20, then the current heading H0 may be retrieved or received from the wheel angle sensor 20 as the current rotational position with reference to the vertical axis 40 of the forward wheel 30. Otherwise, the current heading H0 may be calculated by a controller 18 that includes a processor, such as a microprocessor. The current heading H0 may be the vector difference between the current position P0 and the last recorded position.

Referring to step 103, a point X1, as seen in FIG. 3, along the path 36 is calculated that is a radial distance R1 away from the current position P0. The controller 18 may be used to calculate the point X1. In other embodiments, another point X2 may be calculated that is a radial distance R2 away from the current position P0.

Referring to step 104, a future heading H1 is calculated that is the vector difference between the point X1 and the current position P0. The controller 18 may be used to calculate the future heading H1. Alternatively, future heading H2 may be calculated as the vector difference between the point X2 and the position P0.

Referring to step 105, the forward wheel 30 is steered to match the future heading H1. The steering may be implemented with the controller 18 issuing information or signals to a wheel steering unit 28 that operates to rotate the forward wheel 30 about the vertical axis 40. If the future heading H1 matches the current heading H0, then no action is taken.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A guidance control system to guide a corner unit of a center pivot irrigation system along a path, the guidance control system comprising:
    an antenna located along a vertical axis through a center of a wheel of the corner unit, the antenna operable to receive signals from at least one external positional information source;
    a receiver in communication with the antenna and operable to process the signals to produce position data corresponding to a current position of the wheel; and
    a controller in communication with the receiver, the controller programmed to steer the wheel to a heading corresponding to a difference between the current position of the wheel and a point along the path.

2. The guidance control system of claim 1, further comprising a gyroscope and a motor, the gyroscope being communicatively coupled to the motor, the motor being drivably coupled to the wheel, and the gyroscope, motor, and wheel being collectively configured to keep the antenna oriented vertically above the wheel.

3. The guidance control system of claim 1, wherein the antenna is further operable to receive global positioning system information.

4. The guidance control system of claim 3, wherein the antenna is further operable to receive global positioning system correction information.

5. The guidance control system of claim 1, wherein the controller is further programmed to transmit a signal to a wheel steering unit that adjusts the angular position of the wheel with respect to the vertical axis.

6. A tower for use with a corner unit of a center pivot irrigation system, the tower comprising:
    an antenna located along a vertical axis through a center of a wheel of the corner unit and operable to receive signals comprising global positioning system information and global positioning system correction information from at least one external global positional system information source that can be processed to produce position data;
    a wheel including a center that is positioned along vertical axis with the antenna;
    a wheel steering unit coupled with the wheel and operable to steer the wheel based on the position data;
    a mechanical drive unit mechanically linked with the wheel and operable to propel the wheel;
    a frame with a shaft located along the vertical axis, wherein the antenna is positioned at a first end of the shaft and a second end of the shaft is coupled to the wheel through a right angle connector and an arm;
    a receiver in communication with the antenna and operable to process the signals to produce positional information corresponding to the current position of the wheel; and
    a controller in communication with the receiver, the controller programmed to transmit a signal to a wheel steering unit that adjusts the angular position of the wheel with respect to the vertical axis.

7. A method of steering a wheel of an irrigation system along a path, the method comprising the steps of:
    a) acquiring a current position of a center of the wheel with an antenna, the antenna being positioned along a vertical axis through the center of the wheel;
    b) calculating a point along the path that is a radial distance from the current position;
    c) calculating a future heading as the vector difference between the point and the current position; and
    d) steering the wheel to match the future heading.

8. The method of claim 7, further including the step of determining a current heading of the wheel.

9. The method of claim 8, wherein the current heading is received from a wheel angle sensor.

10. The method of claim 8, wherein the current heading is calculated as the vector difference between the current position and a previously recorded position.

11. The method of claim 8, further including the step of transmitting a signal to a wheel steering unit to rotate the wheel about a vertical axis through the center of the wheel if the future heading is different from the current heading.

* * * * *